(12) United States Patent
Berger et al.

(10) Patent No.: US 6,896,112 B2
(45) Date of Patent: May 24, 2005

(54) CLUTCH-ACTUATING DEVICE AND METHODS OF DETERMINING CLUTCH PARAMETERS

(75) Inventors: Reinhard Berger, Buhl (DE); Thomas Rammhofer, Sasbach (DE); Martin Zimmermann, Sasbach (DE); Holger Stork, Buhl (DE); Gunter Hirt, Kongsberg (NO); Andreas Pfeiffer, Holzkirchen (DE); Thomas Jager, Meckenbeuren (DE); Martin Brandt, Worth An Der Donau (DE); Andreas Deimel, Ingolstadt (DE)

(73) Assignee: Luk Lamellen und Kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 10/733,175

(22) Filed: Dec. 10, 2003

(65) Prior Publication Data

US 2004/0188218 A1 Sep. 30, 2004

Related U.S. Application Data

(63) Continuation of application No. PCT/DE02/02072, filed on Jun. 7, 2002.

(30) Foreign Application Priority Data

Jun. 13, 2001 (DE) .......................... 101 28 684

(51) Int. Cl.[7] .............................................. F16D 28/00
(52) U.S. Cl. ........................................ 192/52.4; 192/90

(58) Field of Search .......... 192/52.4, 90; 477/174–176, 477/180; 701/67, 68

(56) References Cited

U.S. PATENT DOCUMENTS

| | | | | | |
|---|---|---|---|---|---|
| 4,646,891 A | * | 3/1987 | Braun | .................. | 477/175 |
| 4,899,858 A | * | 2/1990 | Cote et al. | ............... | 477/83 |
| 5,390,497 A | * | 2/1995 | Cottam | .................. | 60/533 |
| 5,624,350 A | * | 4/1997 | Bates | .................. | 477/78 |
| 6,022,295 A | * | 2/2000 | Liu | .................. | 477/180 |
| 6,050,379 A | * | 4/2000 | Lyon | .................. | 192/54.1 |

FOREIGN PATENT DOCUMENTS

| | | |
|---|---|---|
| DE | 44 26 260 A1 | 2/1995 |
| DE | 198 23 089 A1 | 12/1998 |
| DE | 198 45 690 C1 | 3/2000 |

* cited by examiner

Primary Examiner—Richard M. Lorence
(74) Attorney, Agent, or Firm—Darby & Darby

(57) ABSTRACT

A clutch-actuating device for a clutch in a motor vehicle power train has an actuator motor driving an actuating member and a transfer mechanism which transmits the movement of the actuating member to a clutch release element that is movable against an opposing force of a clutch spring to displace the clutch from a closed position to an open position. The transfer mechanism has a first movement range in which the movement of the actuating member in the opening direction of the clutch does not displace the clutch from its closed position, and a second movement range in which the movement of the actuating member causes a displacement of the clutch. The transfer mechanism has an interval of loose play, which is used up within the first range.

10 Claims, 5 Drawing Sheets

CLUTCH-ACTUATING DEVICE AND METHODS OF DETERMINING CLUTCH PARAMETERS

CROSS-REFERENCE TO RELATED APPLICATION

This application is a continuation of International Patent Application Ser. No. PCT/DE02/02072, filed Jun. 7, 2002, which published in German on Dec. 19, 2002 as WO 02/101258 A2.

BACKGROUND OF THE INVENTION

The invention relates to a clutch-actuating device, in particular for use in the power train of a motor vehicle. The invention further relates to a method of determining a closed clutch position, a method of determining the actuating force of a clutch, as well as a method of determining the temperature of an actuator motor.

Automated clutches are being used to a growing extent not only for the increase in comfort that they provide but also for their potential advantage to save fuel in motor vehicles.

The block diagram of FIG. 9 shows an example of a power train of a motor vehicle that is equipped with an automated clutch. The power train includes a combustion engine 2, a clutch 4 and a transmission 6. A drive shaft 8 leads from the transmission to the driven wheels, which are not shown in the drawing. The transmission 6 consists, e.g., of an automated manual-shift transmission or a cone-pulley transmission with a steplessly variable transmission ratio. The transmission 6 is actuated or shifted by means of an actuating device 9 which is controlled in a conventionally known manner from a selecting device 10 by means of a selector lever 12 and through a control device 14. As is self-evident, the selecting device can also be configured differently, for example as a conventional stick-shift lever (H-pattern) or as a lever with tipping positions for up-shifting and down-shifting. The clutch 4 is configured, e.g., as a friction disc clutch of a conventional design with an actuating device 16 based on a hydraulic, electrical, electro-hydraulic, or other working principle.

The inputs of the control device 14 are connected to sensors which may be arranged in the power train. The sensors may include, e.g., a pressure sensor 18 to determine the intake suction pressure of the engine 2, an rpm-sensor 20 to determine the rpm-rate $n_M$ of the engine crankshaft, a sensor 22 to detect the depression angle α of an accelerator pedal 24, a sensor 26 to detect the position of the selector lever 12, and a further rpm-sensor 28 to determine the rpm-rate of the drive shaft 8.

The control device 14 contains a conventional arrangement of a microprocessor with associated storage memory 29 where characteristic data arrays and programs are stored that are used to control actuators such as an engine-load actuator 30 of the engine 2, the actuating device 16 of the clutch 4, as well as the actuating device 9 of the transmission 6. The individual actuators can be based on a functional principle in which the actuator position is directly known in the control device 14 as is the case, e.g., with stepper motors, or the actuator position can be determined by an additional position sensor such as the position sensor 32 for determining a parameter that is indicative of the position $S_K$ of the clutch.

The design and function of the foregoing system are known per se and are therefore not discussed in detail.

Depending on the driver's input that is communicated through the accelerator pedal 24 or the driver's request for a program mode or forward/reverse direction as communicated through the selector lever 12, the engine-load actuator 30, the clutch-actuating device 16, and the transmission actuator 9 are operated in a mutually coordinated process dependent on the sensor signals, resulting in a comfortable and/or economical driving behavior of the vehicle.

For example, a memory location of the control device 14 contains a characteristic data set for the actuation of the clutch 4, correlating a target position of the clutch-actuating device 16 to a specific amount of torque to be transmitted by the clutch 4. For reasons related to the control loop quality, the wear on the clutch and the energy consumption of the actuating device, the transmittable clutch torque at a given time should be set no higher than absolutely necessary. The amount of torque that needs to be transmitted through the clutch is based on the driver's input, i.e., the position of the accelerator pedal 24, and the engine load of the combustion engine 2 as detected, e.g., by the sensor 18. Additional operating parameters such as, e.g., the engine rpm-rate, may also enter into the determination of the transmittable torque.

The characteristic data set stored in the control device 14 for the functional correlation between the displacement target of a clutch-actuating member operated by the actuator device 16 and the calculated amount of torque to be transmitted by the clutch has a critical influence on a comfortable start-up behavior of the vehicle as well as a comfortable gear-shift experience. The correlation is subject to short-term fluctuations, for example due to temperature changes, as well as long-term drift over the lifetime of the clutch, for example as a result of wear. The characteristic correlation between actuator displacement and clutch torque under specific operating conditions is therefore continuously monitored according to a diversity of strategies, and the affected control parameters are adapted.

An example of an actuating device 16 is shown in detail in FIG. 10.

A piston 38 moving in a hydraulic master cylinder 36 has a shaft 40 with a spindle profile that engages an internal thread of a gear 41 which, in turn, meshes with a pinion gear 42 of an electric motor 43 that is controlled by the control device 14 (FIG. 4). The electric motor can be of any appropriate type and is controlled, e.g., by a pulse-width-modulated signal. A stepper motor represents an advantageous choice. The master cylinder 36 has a snifting bore 44 connected to a compensation reservoir (not shown) by way of a conduit 45. A conduit 48 leads from the pressure compartment 46 of the master cylinder 36 to a slave cylinder 50 containing a piston 52 connected for example by a piston rod to the clutch release lever 54 which represents an actuating element. The position A, generally referred to as the snifting position, represents the point at which the build-up of clutch-actuating pressure begins in the pressure compartment 46 after the piston 38 has moved to the right of point A in FIG. 11.

In the illustrated example, an incremental position sensor 32 of a conventional type is arranged at the gear 41, counting the number of gear teeth moving past the sensor by sending pulse signals to the control device 14. The number of pulses is a direct measure of the displacement of the master-cylinder piston 38. When the piston 38 is in a position to the right of the snifting position A in FIG. 9, the number of pulses also represents a measure for the displacement of the clutch release lever 54.

In a so-called snifting phase, the master-cylinder piston 38 is moved to the left beyond the snifting position A, so that the hydraulic connection between the pistons 38 and 52 is connected to the conduit 45 and thus relieved of pressure. It is advantageous if the master-cylinder piston 38 has a check valve (not shown) that opens if there is an overpressure to the left of the piston 38. In the pressure-free state of the hydraulic line, the release lever 54 takes a position that represents the fully engaged state of the clutch. As the master-cylinder piston 38 is subsequently moved to the right by the electric motor 42, the release lever 54 is actuated from the moment at which the master-cylinder piston 38 moves past the snifting position A. This position of the piston 38 can be detected in a diversity of ways. The corresponding pulse count of the incremental position sensor 32 is stored in the control device 14 as a reference parameter, hereinafter referred to as the closed position of the clutch.

Seen as an overall system, the actuating device according FIG. 10 represents a transfer mechanism in which a small, substantially constant force K moves the master-cylinder piston 38 inside a range 1 (FIG. 11) to the left of the snifting position A, and an increasing amount of force K is required to move the master-cylinder piston to the right after passing over the snifting bore, i.e., in range 2 (FIG. 11) to the right of the position A, to disengage the clutch against the opposing force of the clutch pressure spring. A linear force/displacement characteristic of the clutch was assumed in the example of FIG. 11.

The foregoing arrangement of the clutch-actuating device with two different ranges, where the transition point corresponds to a defined clutch position, preferably the fully engaged position of the clutch, has the significant advantage that the defined clutch position can be reliably detected in the manner described above.

OBJECT OF THE INVENTION

The object of the invention is to provide a clutch-actuating device which does not rely on the conventional hydraulic circuit with a snifting bore of the foregoing description, but nevertheless maintains the concept of two ranges where an actuation of a motor-driven clutch-actuating element within the first range will not change the state of the clutch. In other words, according to this objective an actuation within the first range will not move the clutch in the direction towards disengagement.

The invention further has the objective of providing methods in which a clutch-actuating device with two actuating ranges is put to advantageous use.

SUMMARY OF THE INVENTION

A clutch-actuating device according to the invention is designed in particular for use in the power train of a motor vehicle. The actuating device includes an actuator motor driving an actuating member and a transfer mechanism to transmit the movement of the actuating member to a clutch release element that is movable against the opposing force of a clutch spring to displace the clutch from an engaged position (also referred to as closed position) to a disengaged position (also referred to as open position). The transfer mechanism according to the inventive concept has a first movement range in which a movement of the actuating member in the opening direction of the clutch does not displace the clutch from its closed position, and a second movement range in which the movement of the actuating member causes a displacement of the clutch. According to the invention, the first range includes a loose play interval in the transfer mechanism. As the actuating member moves through the first range, the loose play is used up with no effect on the clutch. The actual displacement of the clutch does not begin until the actuating member reaches the transition point from the first to the second range.

An advantageous embodiment of the clutch-actuating device includes a compensation spring mechanism which introduces a first force/displacement characteristic into the movement of the actuating member within the first range. In the second range, the force/displacement characteristic of the clutch itself (also referred to as clutch displacement characteristic) is superimposed on the first force/displacement characteristic.

The invention further extends to a method of determining the closed position of a clutch that is equipped with the clutch-actuating device of the foregoing description. The inventive method includes the steps of moving the actuating member through a transition range from the first to the second range while simultaneously monitoring a parameter that changes in a predetermined manner during the transition. The closed position is found as the position where the parameter change is detected. The parameter that is monitored in this method can be a parameter that is measured either at the actuator motor or within the transfer mechanism, or at the clutch itself.

In an advantageous development of the foregoing method, the movement of the actuator motor is modulated with a superimposed oscillation of small amplitude in relation to the actuation itself. This refinement of the method improves the accuracy in determining the closed position.

The method can be advantageously applied in a clutch-actuating device where the transfer mechanism contains a hydraulic circuit with a snifting bore. The closed position is in this case determined in conjunction with a snifting cycle.

In the foregoing method, the parameter used to determine the closed position is represented by the hydraulic pressure downstream of the snifting bore.

The parameter that is monitored in order to find the closed position can be represented by at least one operating parameter of the actuator motor. For example, the power consumption of the actuator motor could be monitored while the motor moves the actuating member at a constant speed of displacement. Alternatively, the displacement speed could be monitored while the actuator motor is operated at a constant power level.

With any of the foregoing embodiments of the inventive method, it is advantageous to perform the determination of the closed position of the clutch immediately after the control unit is initialized, prior to starting the engine, and prior to the first disengagement that is followed by re-engagement to the onset point of frictional traction (also referred to as the gripping point of the clutch). This concept avoids errors in the start-up parameter values which can manifest themselves for example in an unsatisfactory creep-speed behavior of the vehicle. When a vehicle is switched off, the tongues of a diaphragm spring in a conventional clutch assume a rest position that is indeterminate within a bandwidth of about 1 mm. As a consequence, an erroneous value for the creep-speed position of the clutch can be stored in the control device, where the stored position value represents the distance between the closed position and the gripping point. If the creep-speed position is based on the erroneous value, the actuator fails to set the correct gripping point position, and the vehicle may not move at all or the engine may stall. If the actuator is moved across the transition point between the first range and the second range immediately after starting the engine, and if the thereby detected closed position of the clutch is stored as an updated closed position value, there will be no errors in the creep mode position of the clutch. In this embodiment of the invention, it is advantageous if the actuating device has a hydraulic circuit with a snifting bore, so that the closed position can be determined from a snifting cycle. As a matter of course, the engine can be started while the brake is applied and the clutch is fully disengaged, in which case the transmission would have to be shifted into the neutral position before engaging the clutch. Alternatively, the engine can also be started with the brake applied, the transmission set to the neutral position, and the clutch fully engaged.

In a clutch-actuating device where the transfer mechanism contains a hydraulic circuit with a snifting bore, the closed position of the clutch is advantageously determined during operating phases where the engine is running while the vehicle is standing still, the brake is applied, and the transmission is in the neutral position. The transmission may be shifted into the neutral position for only a short time interval under actuator control. This has the advantage that a snifting cycle is performed whenever the vehicle is in one of the operating phases just described, which can occur at any time during operation of the vehicle. As a result of the snifting cycle, the temperature expansion of the fluid in the hydraulic system is compensated and the possibility of a change in the gripping point position of the clutch is avoided.

The actuating force required in a clutch with the actuator device described above can be advantageously determined if the first range and the second range of movement of the actuating member have different force-displacement characteristics. The method of determining the actuating force has the steps:

moving the actuating member through at least part of the first range;

determining a first value of an operating parameter of the actuator motor, i.e., a parameter value that is representative of a known force generated by the actuator motor to move the actuating member within the first range;

moving the actuating member through at least part of the second range;

determining a second value of the aforementioned operating parameter, i.e., a parameter value that is representative of the force generated by the actuator motor to move the actuating member within the second range; and determining the actuating force based on the aforementioned known force and on the first and second values of the operating parameter.

The temperature of an actuator motor, in particular of an electric actuator motor, can be advantageously determined if the first range and the second range of movement of the actuating member have different force-displacement characteristics. The method of determining the temperature of the actuator motor has the steps:

moving the actuating member through at least part of the first range;

determining at least one temperature-dependent operating parameter value of the actuator motor, i.e., an operating parameter value that is dependent on the temperature of the actuator motor;

comparing the at least one temperature-dependent operating parameter value to a stored table of parameter values as a function of temperature values, and determining the temperature of the actuator motor from the stored table by finding a match between the at least one temperature-dependent operating parameter value and one of the parameter values in the stored table.

BRIEF DESCRIPTION OF THE DRAWINGS

The invention, which is applicable to all motor-actuated clutches, will be described below based on examples that are illustrated in the attached schematic drawings, wherein.

DETAILED DESCRIPTION OF PREFERRED EMBODIMENTS

Figure 9:
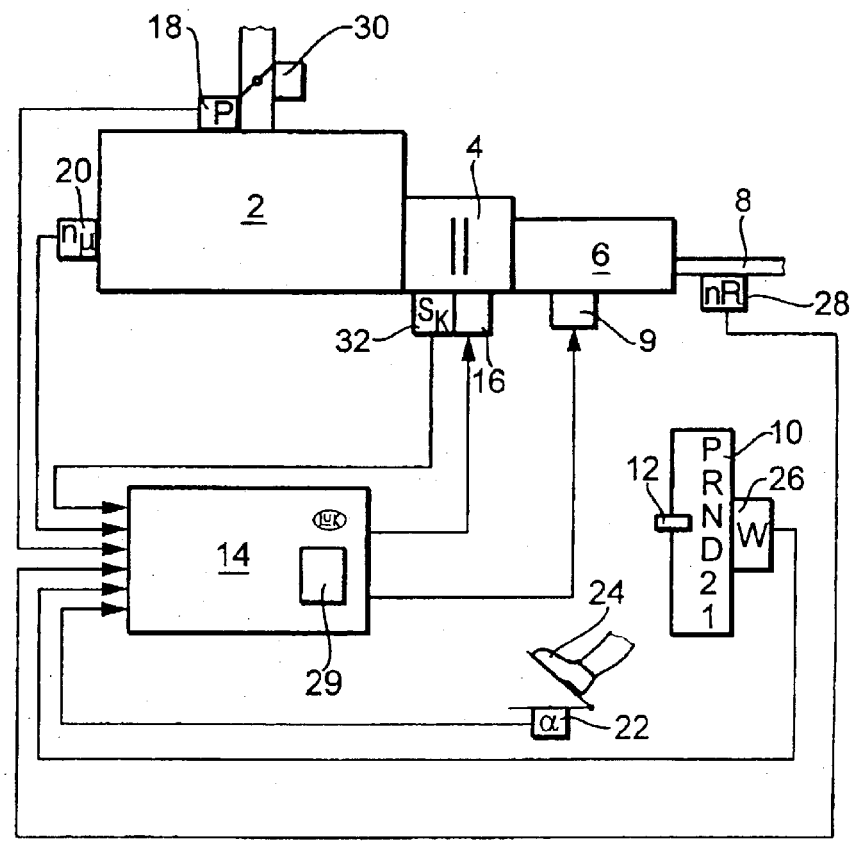
FIG. 9 represents the principal parts of a power train of a motor vehicle including a control module.

Each of the clutches discussed in the following description is of the kind shown for example in FIG. 9, where the clutch is driven by a motor, preferably an electric motor, with one of a variety of different transfer mechanisms arranged between the motor and the clutch.

Figure 1:
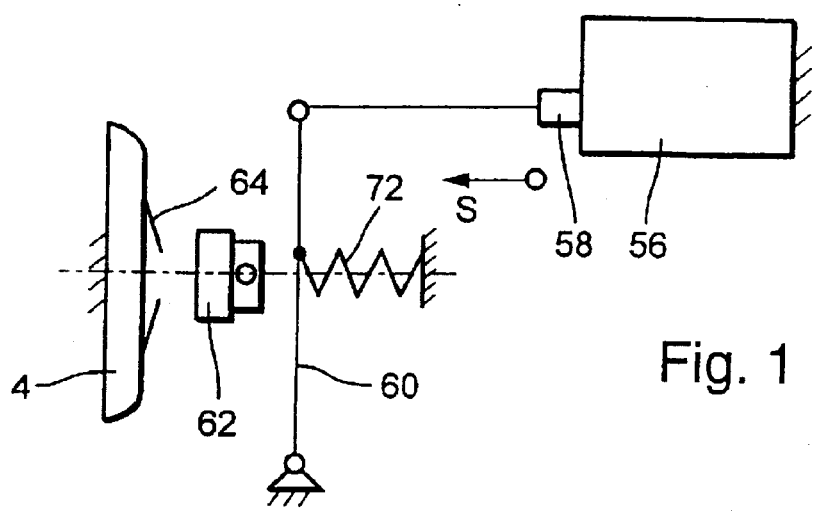
FIG. 1 represents a first embodiment of an actuating device for a clutch.
Figure 10:
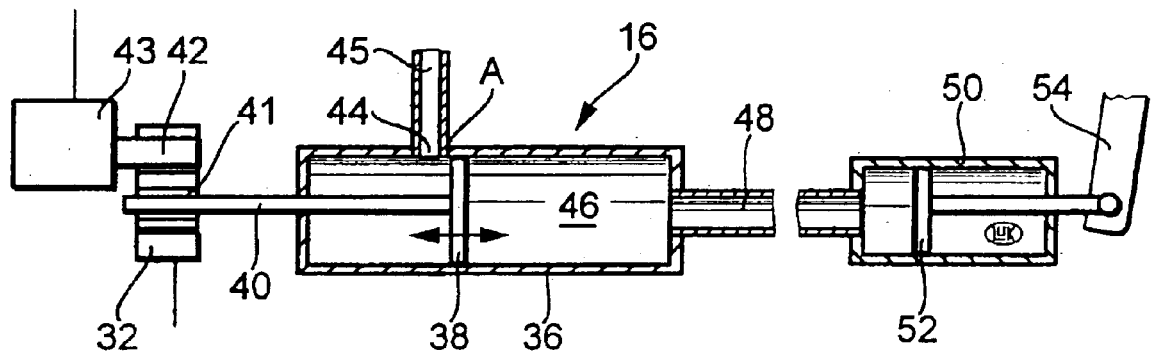
FIG. 10 represents a clutch-actuating device with a hydraulic transfer mechanism.

FIG. 1 shows a first example of a mechanical transfer mechanism which lacks an integrated adjustment feature. An actuator motor 56, for example an electric motor, drives the linear movement of a push/pull element 58, that is coupled to a clutch-release fork 60 which, in turn, is coupled to a release bearing 62 of the clutch 4. The release bearing 62 has linear mobility. In the illustrated position, the release bearing 62 is separated from the diaphragm tongues 64 of the clutch. The clutch, which under the conditions illustrated in FIG. 1 is completely engaged, will become disengaged by pushing the tongues 64 in the leftward direction of FIG. 1. The kinematic correlation between the elements of FIG. 1 is such that in the engaged state of the clutch, the release bearing 62 moves into a position where it is separated by a distance from the diaphragm tongues 64. As a result, after activating the clutch actuator 56 from an initial position, the release bearing 62 is at first moved leftward substantially without applying a force, until it meets the resistance of the diaphragm tongues and disengages the clutch against the opposing force. The force/displacement characteristic for the clutch disengagement just described is substantially of a shape as shown in FIG. 10.

Figure 2:
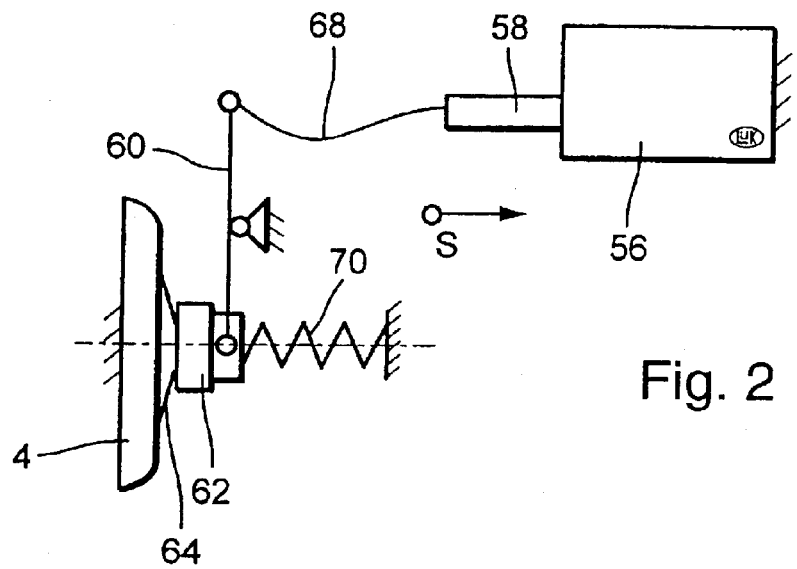
FIG. 2 represents a variation of the embodiment of FIG. 1.

FIG. 2 illustrates a variation of the actuating device of FIG. 1. One difference lies in the release fork 60, which in FIG. 2 is configured as a two-armed lever. Furthermore, the release bearing 62 is urged into contact with the diaphragm tongues 64 by a pre-tensioning spring 70 which, however, exerts a markedly weaker force than the opposing force of the diaphragm tongues 64. The push/pull element 58 is connected to the release fork 60 through a pull rope 68 which has a certain amount of slack when the actuator is in the initial position shown in FIG. 2. As is self-evident, the force displacement characteristic for the movement of the push/pull element 58 in FIG. 2 in the direction of arrow S is again of the shape illustrated in FIG. 10.

Dependent on the kinematic arrangement of the actuator and the configuration of a compensating spring, it is possible to realize different force/displacement characteristics for the movement of the push/pull element 58.

Figure 3:
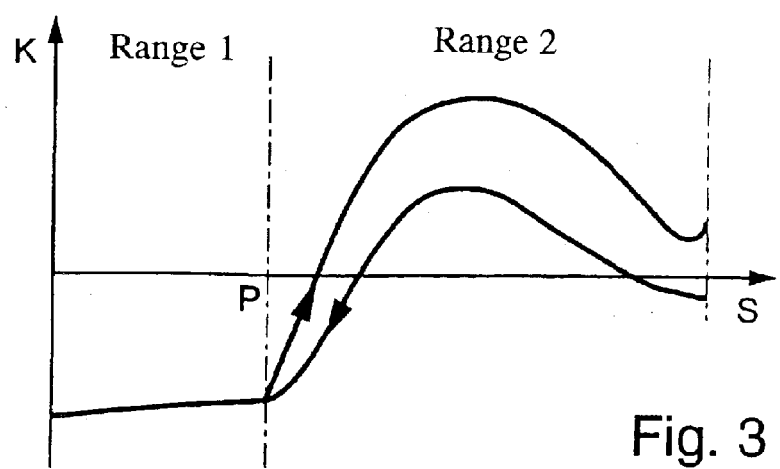
FIG. 3 represents a force/displacement characteristic of an actuating member of a clutch.

FIG. 3 represents a force/displacement characteristic where the force in Range 1 is only slightly dependent on the displacement. In Range 2, where the clutch is moved out of engagement, the force increases strongly at first with increasing disengagement of the clutch. After the force has reached a maximum, it decreases with the further movement of the clutch until the latter is fully disengaged. In the subsequent re-engagement of the clutch, the force/displacement graph runs in the reverse direction back to Range 1 with substantially the same curve shape except for a hysteresis offset. This profile shape of the force/displacement characteristic can be realized for example by inserting a spring 72 in the arrangement of FIG. 1. The spring 72 acts between the release fork 60 and a stationary seat that is fixed relative to the clutch housing. The curved shape of the force/displacement characteristic in Range 2, which is superimposed on the continuation of the linear characteristic of Range 1, is realized through a suitable configuration of the diaphragm spring.

As stated at the outset, the invention proposes methods to determine:
a) the closed position of the clutch,
b) the actuating force, and
c) the temperature of the actuator motor.
a) Determining the Closed Position The position P in FIG. 3 (corresponding to position A in FIG. 10) at the transition from Range 1 to Range 2, which represents the closed position of the clutch, can be accurately detected based on the different characteristic curves in the two ranges or, more specifically, based on the different conditions represented by the characteristic curves. In the embodiment of FIG. 10, one could for example arrange a pressure sensor at the pressure compartment 46 to indicate when the pressure begins to rise sharply, or to detect with a suitable sensor when the release lever 54 begins to move. The associated position of the position sensor 32 (see FIG. 9) can be stored in the control device 14, so that the closed position of the clutch is defined precisely through the associated rotary position of the actuator.

It is advantageous to determine the position P through a direct detection of operating parameter values of the electric motor or actuator motor 56. For example, a current torque of the electric motor can be calculated from the rpm-rate and the supply voltage of the motor as a function of time. The electric motor torque corresponds directly to the actuating force, after a correction has been made for the dynamic effect of the mass moment of inertia during transient phases.

Figure 4:
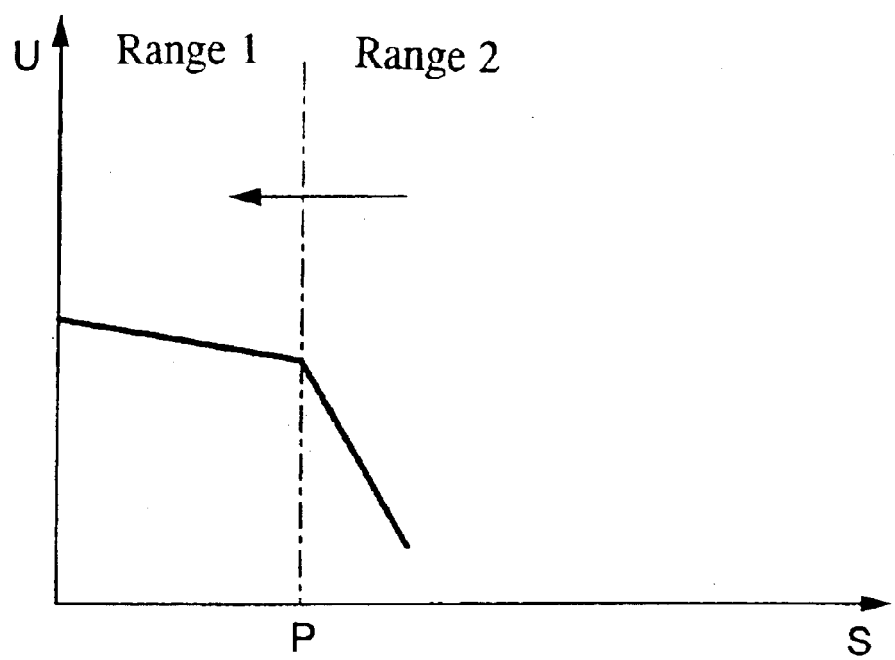
FIG. 4 represents a voltage/displacement characteristic of an actuator motor.

If the electric motor is operated at a constant rpm-rate and the clutch actuation has a characteristic curve according to FIG. 3, the voltage U of the electric motor will follow the profile according to FIG. 4. The direction of movement of the actuation is indicated by the arrow in FIG. 4. The break in the voltage curve U can be detected by the control device 14, and the rotor position of the electric motor at the time when the break is detected is stored as the closed position P.

Figure 5:
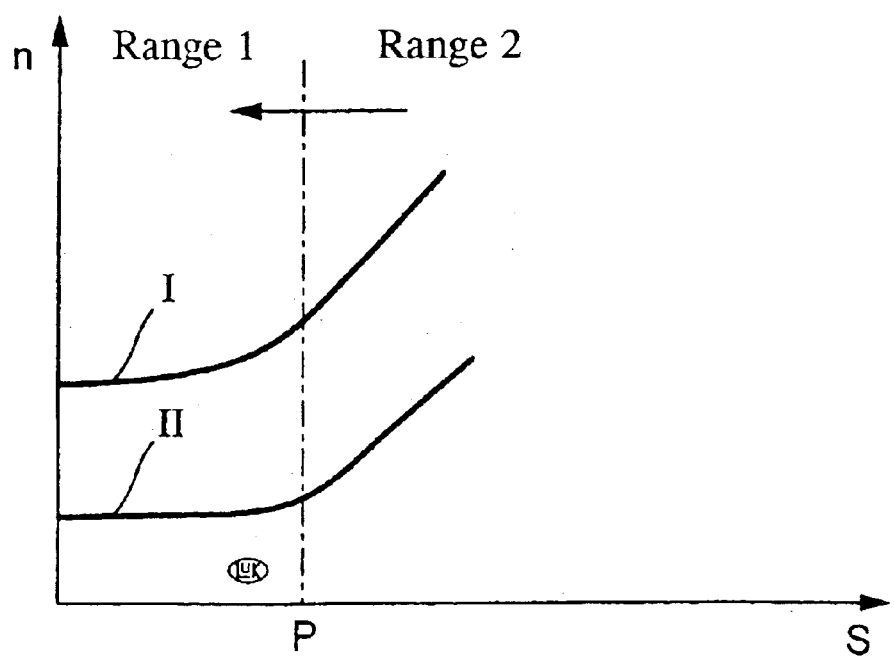
FIG. 5 represents an rpm/displacement characteristic of an actuator motor.

In the example of FIG. 5, the electric motor is operated at a constant voltage, while the rpm-rate n is being detected. Curve I relates to a case where the electric motor is powered by a relatively high voltage. The break in the rpm/displacement characteristic is strongly rounded in this case. In contrast, curve II shows the rpm/displacement characteristic at a low supply voltage, where the break at the position P is more pronounced.

As is self-evident, the closed position of the clutch in the arrangement of FIG. 10 (corresponding to a rotor-position of the electric motor 43 where the piston 38 is at point A) could likewise be determined in accordance with the principles illustrated in FIGS. 4 and 5, based on the fact that the torque load on the electric motor changes abruptly at the moment when the clutch-actuating member moves through point A.

Particularly in a case where only a very small actuating force is required in Range 1 (as with the hydraulic transfer mechanism of FIG. 10) it is advantageous to operate the actuator motor in such a way that in the transition area between Range 1 and Range 2, an oscillatory back-and-forth movement of a predetermined displacement amplitude or a predetermined torque amplitude is superimposed on an underlying monotonic (one-directional) movement from Range 1 to Range 2 or vice versa. Based on the power consumption of the actuator motor during one period of the oscillation or from the displacement amplitude that occurs in response to a predetermined torque, it is possible to accurately determine the location of point A (in FIG. 10) or P (in FIG. 3).

Actuation cycles of the clutch for the purpose of determining the closed position can be performed during the operation of the vehicle at such times where it will not be noticed by the driver if the clutch is moved from the closed position to an at least partially disengaged position, for example when the vehicle is standing still and the transmission is in the neutral position, with or without the brake being applied by the driver or by an anti-lock braking system or vehicle-stabilizing system. Another possibility to perform such an actuation cycle exists when the vehicle is rolling and the transmission is in the neutral position, or also during short time intervals when the vehicle is driven at a low level of engine torque.

It is important to know the exact closed position of the clutch, i.e., the starting point for the clutch actuation, because the gripping point of the clutch (i.e., the point where traction begins to be transmitted) needs to be approached quickly in a start-up phase of the vehicle or during gear shifts. The quick approach is made possible by the fact that the distance between the closed position of the clutch and the gripping point of the clutch is stored in the control device 14. Based on the known closed position and the known distance to the gripping point, the control device can direct the actuating movement to proceed immediately to the gripping point. The distance between the gripping point and the closed position is subject to change as a result of a diversity of influences, for example as the clutch spring settles, or due to temperature effects, so that the closed position as well as the gripping point of the clutch has to be updated.

If it is not possible to perform an adaptation of the closed position after an adaptation of the gripping point, the distance between the gripping point and the closed position can be assumed to remain constant for an interim time period. The closed position stored in the control device 14 is changed in accordance with the shift in the gripping point, after the latter has been updated, until a new adaptation of the closed position occurs, at which time the stored value for the distance may be corrected if necessary. Conversely, if it is not possible after an adaptation of the closed position to update the gripping point, the gripping point for the time being is shifted in accordance with the updated closed position, and an adaptation of the gripping point is performed later, at which time the distance between gripping point and closure point may also be updated if necessary.

b) Determining the Actuating Force

In many applications it is advantageous to know the magnitude of the clutch-actuating force in order to control the electric motor appropriately, so that the required actuating speed ranges can be maintained which have an effect on the shifting behavior and/or the start-up behavior of the vehicle. Furthermore, changes in the actuating forces can be indicative of clutch malfunctions.

Figure 11:
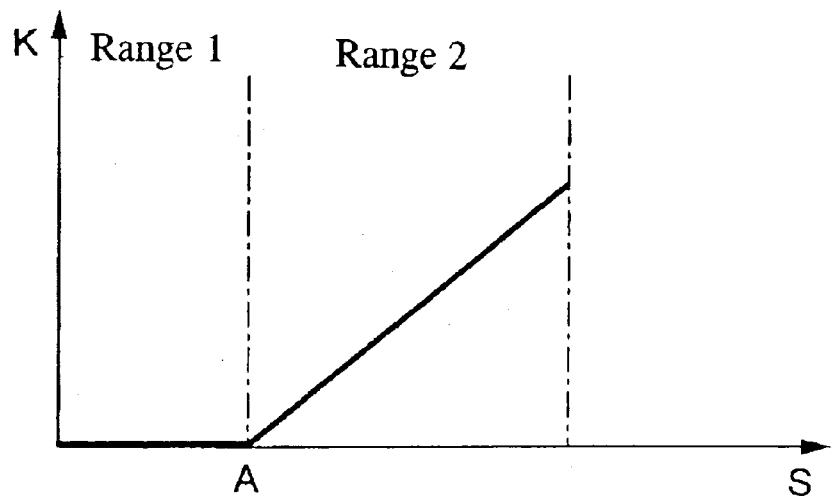
FIG. 11 represents a force/displacement characteristic of the actuating device of FIG. 10.

In actuators that have force/displacement characteristics with two different ranges as for example in FIGS. 3 and 11, the actuating force can be determined by first determining the actuating force or actuating torque required in Range 1 based on a measurement of a suitable operating parameter of the electric motor. Next, the value for the same parameter in Range 2 is measured. Based on the known magnitude of the force in Range 1 and the known relationship between the parameter values in Range 1 and Range 2, the force in Range 2 can be calculated. In general, the actuating force in Range 1 does not change appreciably during the operating life of the clutch, so that a relatively accurate determination of the actuating force in Range 2 is possible. It is self-evident that the force in Range 1 does not have to be determined in absolute terms but that relative changes of the force in Range 2 can be determined on the basis of detected changes in the relationship between the respective operating parameter values in the Ranges 1 and 2.

Figure 6:
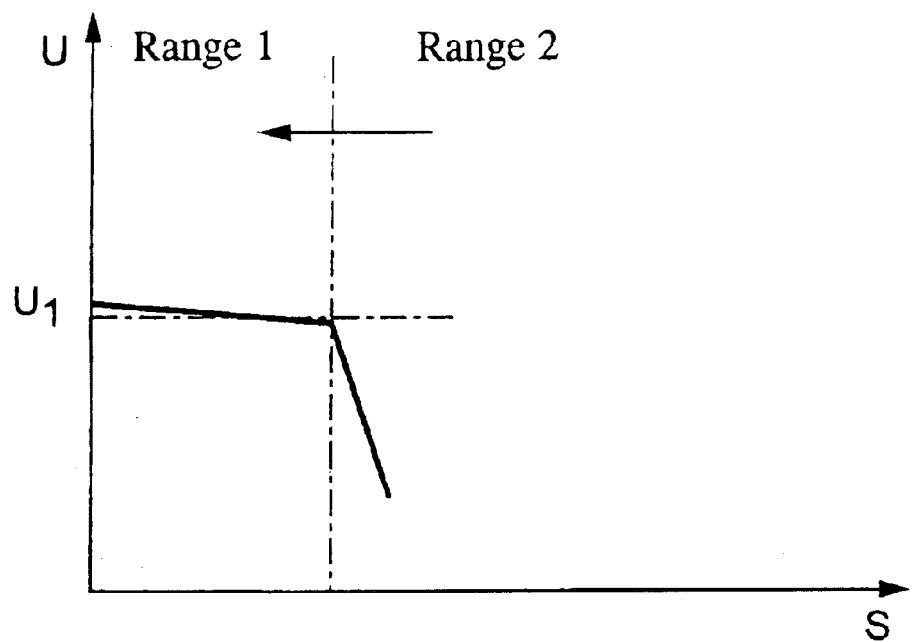
FIGS. 6 and 7 represent graphs to illustrate how a clutch-actuating force is determined.
Figure 7:
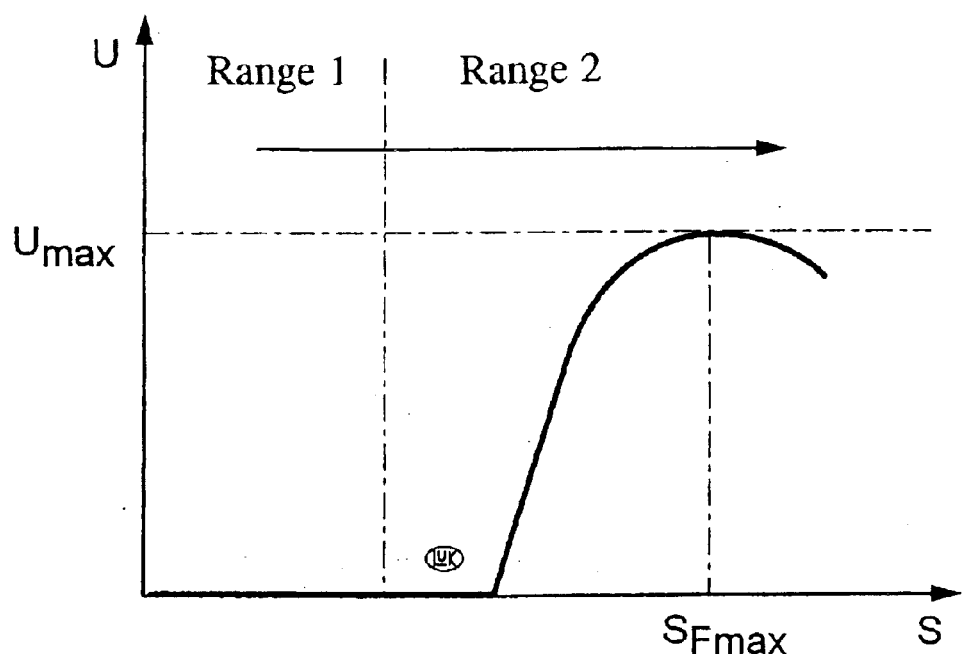

An example of a test routine for the determination of the actuating force of the clutch is explained through the illustrations in FIGS. 6 and 7, where the voltage of the electric motor 56 is represented as a function of the displacement s, also showing in each case the direction of clutch movement.

In an operating situation where the vehicle is driven with a very small amount of engine torque or where the transmission is in the neutral position, the clutch is moved into full disengagement beyond the position of maximum disengagement force (see FIG. 3);

The clutch is moved into full engagement, and the actuating member is further moved all the way through Range 1, operating the electric motor at constant speed so that the voltage U represents a measure for the amount of force being generated. The voltage U applied to the motor to move through Range 1 (in either direction) is stored as $U_1$ (FIG. 6);

After traversing Range 1 from left to right, Range 2 is again traversed at constant speed beyond the position of the actuating force maximum. The maximum rotor voltage $U_{max}$ occurring in this phase of the movement is detected and stored (FIG. 7);

Next, the maximum value of the actuating force $F_{max}$ is calculated based on the known compensation force (i.e., the force of the compensation spring mechanism) $F_1$ in Range 1, on the value $Fs_{max}$ of the compensation force at the location of the maximum actuating force, and further based on the stored voltage values, according to the following formula:

$F_{max}=(U_{max}/U_1) \times F_1 + Fs_{max}$

It should be understood that the actuating force can also be determined through non-stationary methods, in which case the dynamic forces resulting from the inertial mass of the moving parts has to be taken into account. The method according to the foregoing description or similar methods of determining the actuating force based on a comparison with the compensation force are applicable in particular to a clutch with a controlled adjustment of the displacement travel (i.e. in a clutch that is not self-adjusting). By comparing the actuating force with the substantially non-changing compensation force, it is possible to detect the wear condition of the clutch and thus the need for a controlled adjustment.

The need for adjustment is indicated if the actuating force has increased by a predetermined amount.

c) Determining the Temperature of the Actuator Motor

In many applications, it is advantageous to know the temperature of the electric motor that performs the actuation of the clutch. For example, the maximum torque of the electric motor and thus the maximum force for actuating the clutch depends on the temperature. This imposes limits on the speed of clutch actuation which is one of the parameters taken into account in the control device together with the engine-load actuator movement and in some cases the transmission actuator movement.

The temperature of the electric motor can be determined by detecting the voltage in function of the rpm-rate of the electric motor when moving through Range 1, where the motor works only against the compensation spring whose properties remain largely unchanged over time, and by comparing the detected functional relationship against a stored temperature-dependent characteristic data field of the electric motor.

Figure 8:
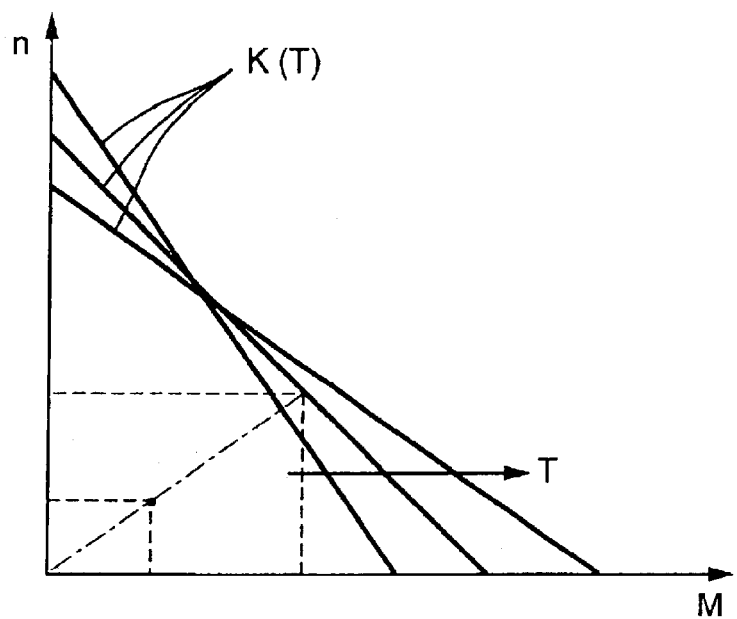
FIG. 8 represents a set of rpm/torque graphs of an electric motor.

FIG. 8 illustrates a set of characteristic curves K associated with different temperatures T. The curves represent the dependency of the rpm-rate n on the torque M of the electric motor when the latter is operated with a reference voltage $U_{ref}$.

The temperature of the electric motor can be determined as follows:

As a first step, the clutch is moved into complete engagement. Then, the actuator is moved through Range 1 at a given small and constant rpm-rate $n_{Test}$.

The operating point of the actuator, i.e. the rotor voltage $U_{Test}$, is detected, while the associated torque value $M_{Test}$ is a known design parameter of the compensation spring.

Based on the test operating point $M_{Test}$, $n_{Test}$ at the voltage $U_{Test}$, as determined by the preceding step, a reference operating point $M_{Ref}$, $n_{Ref}$ at a reference voltage $U_{Ref}$ (which may represent, e.g., the maximally possible voltage) is calculated in accordance with the following equations:

$M_{Ref}=(U_{Ref}/U_{Test}) \times M_{Test}$ $n_{Ref}=(U_{Ref}/U_{Test}) \times n_{Test}$ The reference operating point determined in the preceding step is compared against the characteristic curve field of FIG. 8. The characteristic curve on which the reference operating point falls indicates the temperature of the actuator motor if the clutch actuation is performed with the maximum value of the rotor voltage.

The devices and methods of the foregoing description can be modified in a variety of ways. The clutch can be of a kinematically reverse type, so that the non-actuated state of the clutch represents the disengaged condition. The actuator motor does not have to be an electric motor; the actuator can be powered hydraulically, pneumatically or in some other way. The arrangement of sensors, likewise, can differ from the foregoing examples.

What is claimed is:

1. A clutch-actuating device for a clutch in a motor vehicle power train, wherein the power train includes an engine, a clutch, a transmission, and a control unit; said clutch actuating device comprising an actuator motor driving an actuating member, and further comprising a transfer mechanism operable to transmit a movement of the actuating member to a clutch release element that is movable against an opposing force of a clutch spring to displace the clutch from a closed position to an open position, wherein the transfer mechanism has a first movement range in which said movement of the actuating member in an opening direction of the clutch does not displace the clutch from its closed position, and a second movement range in which the movement of the actuating member causes a displacement of the clutch, wherein the transfer mechanism has an interval of loose play, and wherein said loose play is used up within the first range, the device further including a compensation spring mechanism which introduces a first force/displacement characteristic into the movement of the actuating member within the first range, wherein the displacement of the clutch in the second range follows a clutch displacement characteristic, and wherein in said second range said clutch characteristic is superimposed on said first force/displacement characteristic.

2. A method of determining the closed position of the clutch that is equipped with the clutch-actuating device of claim 1, comprising the steps of:
    moving the actuating member through a transition from the first to the second range while simultaneously monitoring a parameter that exhibits a predetermined characteristic change during said transition,
    detecting said predetermined characteristic change and equating a position where said characteristic change and occurred to the closed position of the clutch.

3. The method of claim 2, wherein the step of moving the actuating member comprises an underlying monotonic movement with a superimposed oscillatory movement, and wherein said oscillatory movement has a small amplitude in comparison to a total displacement range of the actuating member.

4. The method of claim 2, wherein the transfer mechanism contains a hydraulic circuit with a snifting bore, and wherein the method is performed in conjunction with a snifting cycle.

5. The method of claim 4, wherein the parameter being monitored comprises a hydraulic pressure downstream of the snifting bore.

6. The method of claim 2, wherein the parameter being monitored comprises at least one operating parameter of the actuator motor.

7. The method of claim 2, wherein the clutch has a gripping point, and wherein said determination of the closed position is performed immediately after initializing the control unit, prior to starting the engine, and prior to a first opening of the clutch that is followed by a closing of the clutch as far as the gripping point.

8. The method of claim 4, wherein said determination of the closed position is performed while the engine is running and a vehicle brake is applied, and wherein—if the transmission is not already in a neutral position—the transmission is set into the neutral position for a short time by interval by a transmission actuator.

9. A method of determining an actuating force of the clutch that is equipped with the clutch-actuating device of claim 1, wherein said first range and said second range have different force-displacement characteristics, the method comprising the steps of:
    moving the actuating member through at least part of the first range;
    determining a first value of an operating parameter of the actuator motor, said first value being representative of a known force generated by the actuator motor to move the actuating member within the first range;
    moving the actuating member through at least part of the second range;
    determining a second value of said operating parameter of the actuator motor, said second value being representative of a force generated by the actuator motor to move the actuating member within the second range; and
    determining the actuating force based on said known force and on said first and second values of the operating parameter.

10. A method of determining a temperature of the actuator motor in the clutch-actuating device of claim 1, wherein said actuator motor is an electric motor and wherein said first range and said second range have different force-displacement characteristics, the method comprising the steps of:
    moving the actuating member through at least part of the first range;
    determining at least one temperature-dependent operating parameter value of the actuator motor, said temperature-dependent operating parameter value being dependent on said temperature of the actuator motor;
    comparing the at least one temperature-dependent operating parameter value to a stored table of parameter values as a function of temperature values, and
    determining the temperature of the actuator motor from said stored table by finding a match between the at least one temperature-dependent operating parameter value and one of the parameter values in said stored table.

* * * * *